UNITED STATES PATENT OFFICE.

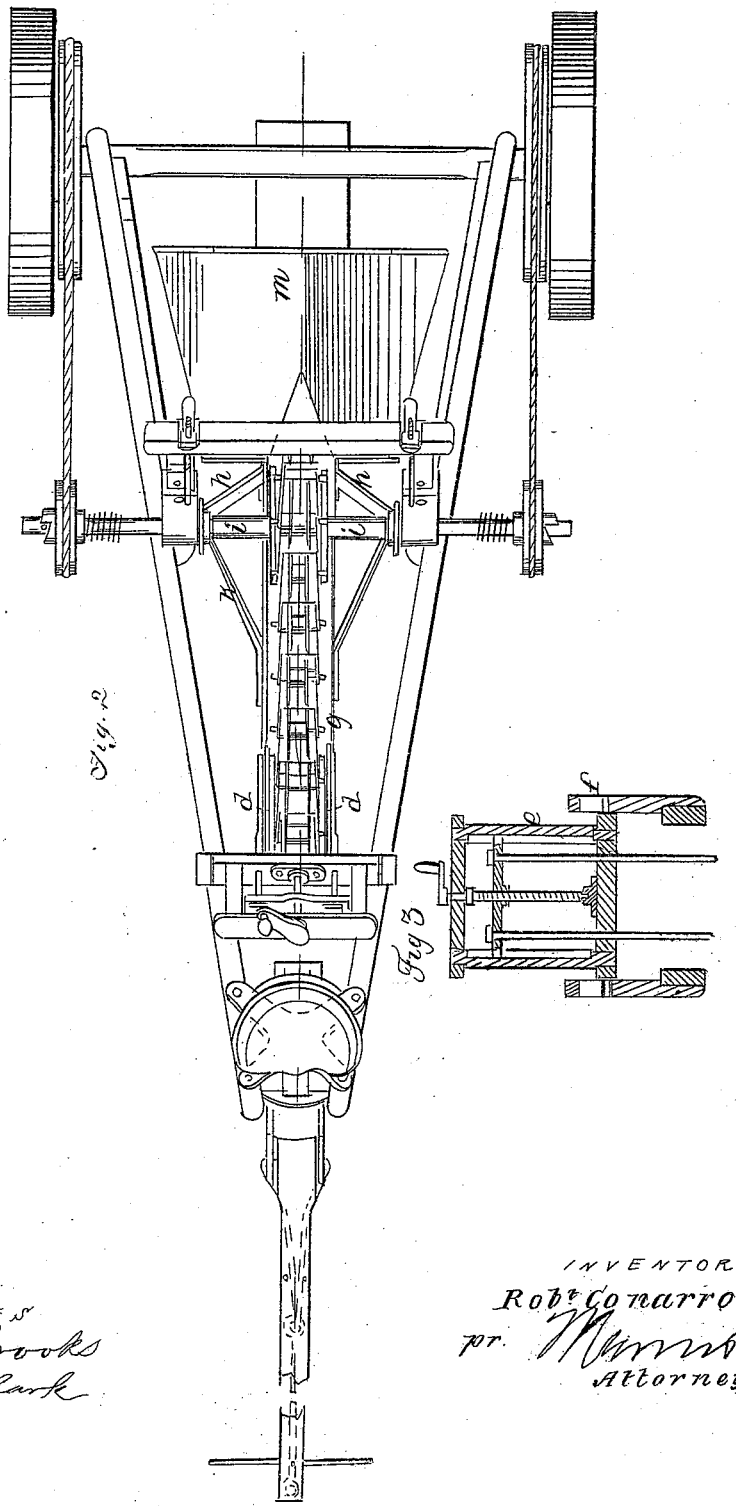

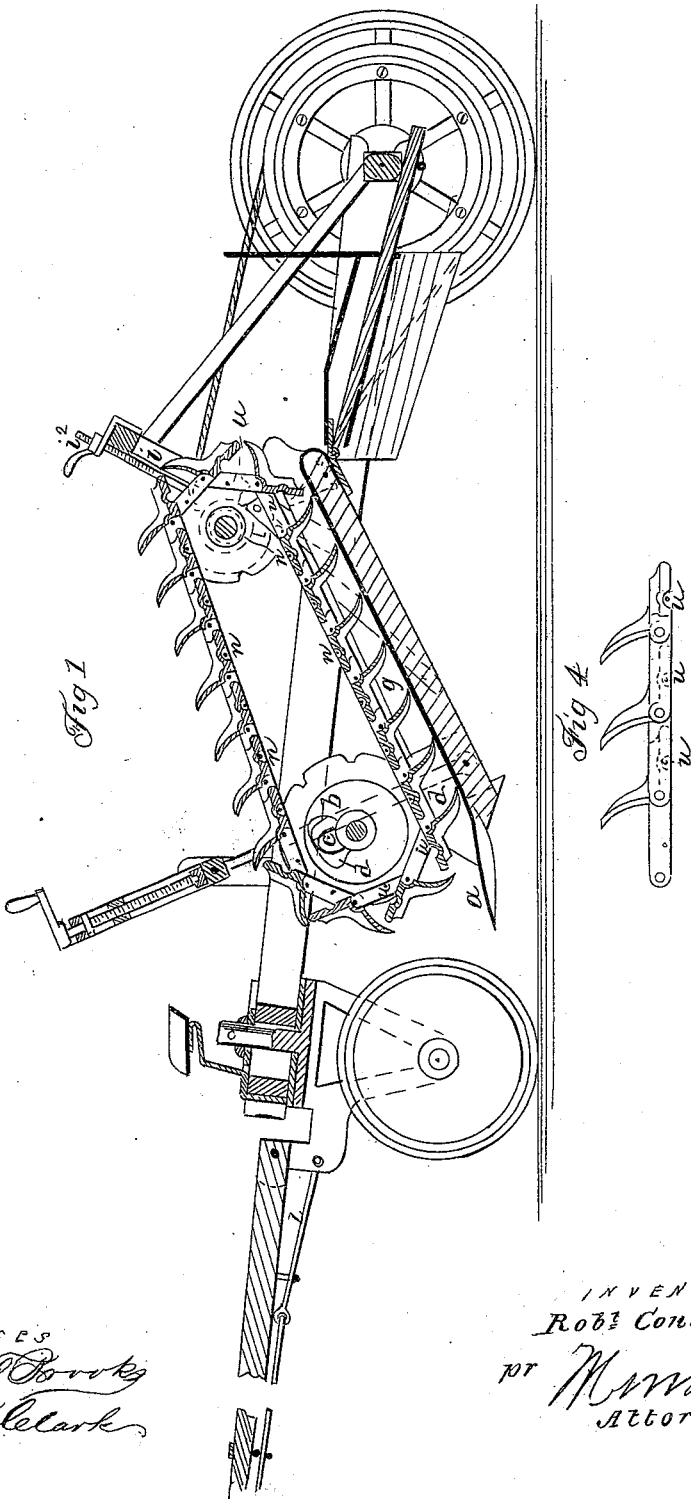

ROBERT CONARROE, OF CAMDEN, OHIO, ASSIGNOR TO HIMSELF, HOWARD YOUNG, WILLIAM KENWORTHY, JESSE JACOBY, AND DAVID J. T. SMYERS, OF SAME PLACE.

IMPROVEMENT IN DITCHING-MACHINES.

Specification forming part of Letters Patent No. 92,707, dated July 20, 1869.

*To all whom it may concern:*

Be it known that I, ROBERT CONARROE, of Camden, in the county of Preble and State of Ohio, have invented a new and useful Improvement in Ditching-Machines; and I do hereby declare that the following is a full, clear, and exact description thereof, which will enable others skilled in the art to make and use the same, reference being had to the accompanying drawings, forming part of this specification.

This invention relates to improvements in machines for making ditches for draining, laying tiles, &c., designed to provide certain improvements on a similar machine patented to me on the 19th day of November, 1867; and the invention consists in an improved arrangement of the driving and supporting mechanism, whereby the cutting is gaged irrespective of the surface of the ground; also, in an arrangement of the suspending devices for the elevator and the plow, whereby either may rise and pass over obstructions which may be encountered; also, in an arrangement for adjusting the tension of the elevator-chain; also, in the draft apparatus for the application of animals in advance of the tongue.

Figure 1 represents a longitudinal sectional elevation of my improved ditching-machine. Fig. 2 represents a plan view of the same, and Figs. 3 and 4 represent detail views.

Similar letters of reference indicate corresponding parts.

In the machine heretofore patented to me the front wheels were employed to apply the power for operating the elevating apparatus, and the latter and the plow were suspended therefrom, the consequence of which was that the gage of the bottom of the ditch was, to a considerable extent, governed by the surface of the ground. In this arrangement I suspend the framing upon two hind wheels to run upon the surface of the ground, and a front caster-wheel to run in the partially-formed ditch after the first cutting is accomplished, whereby the gage of the bottom may be made more level and uniform. In this instance I have also improved the form of the plow, which is provided with a sharp point and elevated in a central line running backward considerably above the position between the said central line and the outer edges, as represented at *a*, Fig. 1. By this arrangement the earth is more easily broken and elevated as the plow is advanced.

The journals of the lower elevator-wheel, *b*, are supported in elongated slots, as shown at *c*, in the housings *d*, whereby the elevator-shovels may be allowed to rise in case of striking stones, logs, or other obstructions.

The journals of the screw-frame *e*, by which the plow is adjusted, are also supported in slotted bearings, as shown at *f*, to allow the plow to rise, also, to escape stones or other obstructions.

For adjusting the tension of the elevator-chain, I suspend the rear end of the trough *g* by the arms *h*, suspended from the shaft *i*, so as to turn freely thereon. These arms are provided with enlargements at their lower ends, where they are connected to the trough, having several bolt-holes for attaching to the trough by screw-bolts or other equivalent devices for attachment to the trough at different points. I provide also long arms *k*, running toward the front of the trough and connected thereto, while their other ends are connected to the arms *h* below the shaft *i*. When the arms *h* are adjusted at their connection with the trough toward the front of the said trough, their action on the long arms will force the trough forward, thereby tightening it.

For hitching other animals in advance of those at the tongue, in order to prevent lateral draft on the said tongue, whereby the operation of the caster-wheel in the partly-formed ditch would be effected, I provide a draft-rod, *l*, hitched near the rear of the tongue, but free to move laterally in a lateral yoke suspended at the front of the tongue.

For discharging the earth delivered by the elevators, I arrange a double chute, *m*, having a dividing-ridge in the center, and arranged to shed the earth in both directions, thereby delivering it equally on both sides of the ditch, inside of the wheels, where it is more conveniently placed for throwing back again when required for covering tile. In this case I have also provided the transverse rods $n$ in the elevator-chain, to hold the elevator-shovels in their proper positions.

In order to maintain the plow in the required level position, I have arranged the bearings of the shaft $i$, from which the rear end of the trough is suspended, so as to be adjusted up and down on the supports $i'$ by the screwed rods $i^2$.

Having thus described my invention, I claim as new and desire to secure by Letters Patent—

1. The arrangement of the caster-wheel, elevators, driving-wheels, and framing, substantially as and for the purpose specified.

2. The arrangement of the journals of the chain-wheel $b$ and suspending frame in elongated bearings, substantially as specified.

3. The arrangement of the suspending arms $h\ k$, trough, and shaft $i$, all substantially as and for the purpose specified.

4. The arrangement of the draft-rod $l$ with the tongue, substantially as specified.

ROBERT CONARROE.

Witnesses:
O. P. BROWN,
F. L. RAIKES.